J. H. SAGER.
SHOCK ABSORBER.
APPLICATION FILED APR. 1, 1910.

970,647.

Patented Sept. 20, 1910.

Witnesses:
L. Thon
E. W. Carroll

Inventor:
James H. Sager
by his attorneys
Osgood, Davis & Dorsey

UNITED STATES PATENT OFFICE.

JAMES H. SAGER, OF ROCHESTER, NEW YORK, ASSIGNOR TO JAMES H. SAGER COMPANY, OF ROCHESTER, NEW YORK, A CORPORATION OF NEW YORK.

SHOCK-ABSORBER.

970,647.  Specification of Letters Patent.  Patented Sept. 20, 1910.

Application filed April 1, 1910. Serial No. 552,900.

*To all whom it may concern:*

Be it known that I, JAMES H. SAGER, a citizen of the United States, and resident of Rochester, in the county of Monroe and State of New York, have invented certain new and useful Improvements in Shock-Absorbers, of which the following is a specification.

This invention relates to devices applicable to the running gear of automobiles and other vehicles, and used to resist the excessive compression and expansion of the vehicle springs which tends to result from irregularities in the road surface.

The object of the invention is to produce a device of this character which shall be simple in construction and efficient in operation, and which shall have provision for adjusting the resistance of the device in a simple and effective manner.

To the beforementioned ends the invention consists in a shock absorber constructed substantially in the manner of the embodiment of the invention hereinafter described and illustrated in the accompanying drawings, as the same is defined in the succeeding claims.

Figure 1:
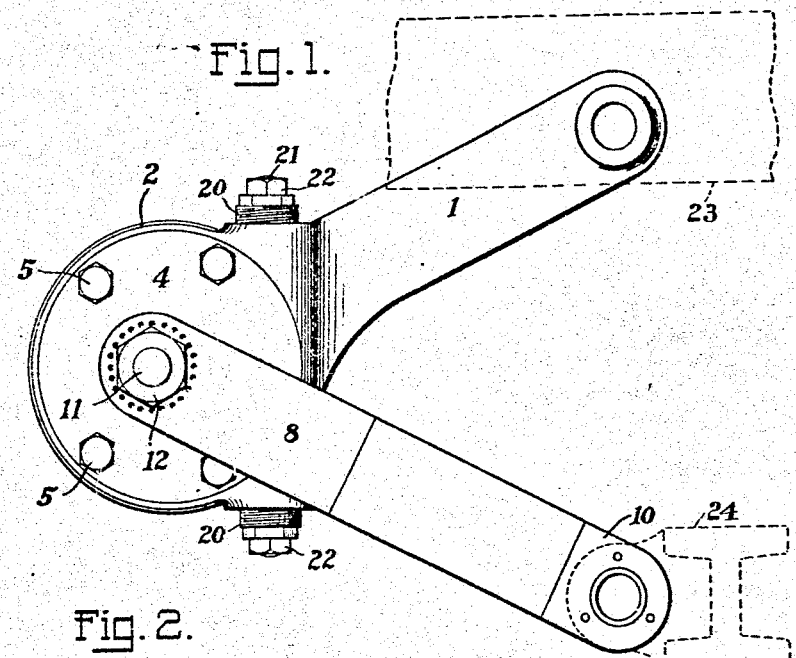
Figure 2:
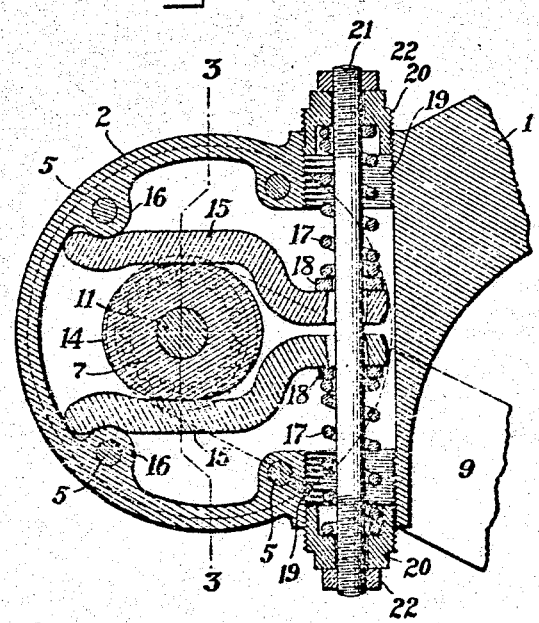
Figure 3:
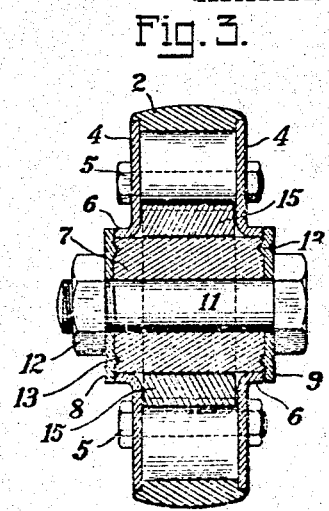

In the drawings: Figure 1 is a side elevation of a shock absorber embodying the present invention; Fig. 2 is a vertical median section, looking from front to rear in Fig. 1; and Fig. 3 is a vertical section on the line 3—3 in Fig. 2, looking from right to left.

The illustrated embodiment of the invention comprises, as is common in devices of this character, two relatively-rotatable members adapted to be connected, respectively, with the frame and the axle of a vehicle, and connections between these members arranged to resist their relative rotation so as to indirectly to resist relative movements of the axle and frame of the vehicle. One of the relatively-rotatable members is in the form of an arm 1 of which one end is enlarged and forms a casing 2 of generally-circular form. This casing is closed at both sides by circular covers 4 of sheet metal which are secured to the casing by bolts 5 passing through internal lugs in the casing. The plates 4 are provided with outward extensions 6 forming bearings for a pivot 7, and to the ends of this pivot are connected the ends of a bifurcated arm constituting the second relatively-rotatable member of the device. This arm consists of two plates 8 and 9, of which the ends are connected, respectively, to the ends of the pivot 7, and the plates 8 and 9 are brought together and united at their outer ends 10 and perforated to provide for pivotally connecting them, in the usual manner, with the axle of the vehicle.

The means for resisting relative rotation of the arms comprise a cam and two levers engaging, and moved by, the cam and controlled in their movements by adjustable springs. As shown in Fig. 3, the cam 14 is formed integral with the pivot 7 and is located within the casing 2. On either side of the cam, as shown in Fig. 2, is a cam lever 15, the levers being provided with recesses in their outer surfaces which engage lugs 16 projecting inward from the casing so as to provide pivotal supports or fulcrums for the levers. The other ends of the levers are subject to the action of compression springs 17 which engage washers 18 bearing against the ends of the levers. The springs project outwardly into recesses 19 in the arm 1, and their outer ends rest against adjusting plugs 20 which have a screw-thread engagement with the recesses 19. The springs 17 subject the levers constantly to pressure so as to hold them in engagement with the cam 14, and the force of the springs may be adjusted by screwing the adjusting plugs in and out the recesses 19. To hold the adjusting plugs in adjusted position, and also to constitute a guide for the springs, a bolt 21 passes longitudinally through the plugs and the springs and through the ends of the levers, which are slotted to receive this bolt. On each end of the bolt 21 is a nut 22. After the adjusting plugs have been adjusted as required the nuts 22 are screwed up to bear against the plugs and thus lock them in adjusted position. The washers 18 fit freely but closely upon the bolt 21 so that they prevent the transmission, from the levers to the springs, of the transverse movement resulting from the curvilinear motion of the ends of the levers.

The cam 14 is a double-throw cam, as shown in Fig. 2, that is to say, by a rotation of the cam in either direction both of the levers are simultaneously moved in opposite directions away from the pivotal center of the device, so as to compress the springs 17. In the normal position of the device, shown in the drawings, the cam levers rest against the lowest portions of the cam surface, and the device may have a slight movement in either direction from this normal position without substantial effect upon the levers, so that the shock absorber does not substantially resist movements of slight amplitude of the running gear of the vehicle to which it is applied. When extreme irregularities in the road surface are encountered, however, so that the vehicle springs tend to be compressed or expanded to a considerable extent, the high portions of the cam come into effective operation and impart movements of corresponding amplitude to the levers 15, thereby compressing the springs so that the pressure, and the resulting friction, between the levers and the cam is greatly increased. While the resistance to the relative movements of the arms due to the frictional engagement between the cam levers and the cam is operative in all positions of the parts to resist relative movements of the arms, the effect of this friction is modified by the fact that the cam levers, after having been swung outwardly by a partial rotation of the cam, tend to operate reciprocally upon the cam and rotate it back to normal position again, thereby partly counteracting the effect of the friction. The device thus operates to resist movement of the springs from their normal condition with a greater force than it resists the return of the springs to normal condition. As a further means for adjusting the shock absorber to various conditions of use the arms are connected together in such a manner that their normal angular position may be varied. To this end the plates 8 and 9 are provided with circular series of projections 13 upon their inner surfaces, these projections being formed conveniently by depressing the metal at the outer surfaces. The pivot 7 is formed with corresponding series of depressions at its ends, and the projections and depressions are normally held in firm engagement by means of a bolt 11 which passes through the plates 8 and 9 and through the center of the pivot and is secured by a nut 12. When it is desired to change the normal angle between the arms the nut 12 is loosened, and the projections and depressions may then be disengaged sufficiently to permit the plates to be turned to a new angular position, in which they are again secured by tightening the nut 12. The body 23 and axle 24 of the vehicle to which the shock absorber is applied are indicated in dotted lines in Fig. 1. The ends of the arms are pivoted to these parts in any usual or convenient manner.

The arrangement of the cam levers on opposite sides of the cam tends to balance the pressure of the levers against the cam so as to avoid unbalanced pressure of the pivot pin against its bearings and thus reduce wear in the device. This action is further enhanced by the provision of independent adjustment of the two springs, since by this means the force of the two levers may be easily equalized. It is to be noted, however, that the operation of the device does not depend upon this equalized action, since the device will still operate effectively even in case one of the springs be broken, or in the case of the entire omission of one of the cam levers and its spring.

The applicant is aware that shock-absorbing devices have been heretofore proposed in which spring-pressed yielding members in the form of slides have been arranged to engage and be actuated by cams, but in such devices comparatively powerful and heavy springs have been necessary, owing to the direct action of the cams on the springs and the consequent small amplitude of movement. The employment of spring-pressed levers, as in the present invention, has the important advantage that it permits the use of springs smaller and lighter than are required for direct action, and this advantage may obviously be secured where the lever is arranged either as a lever of the third class, as in the illustrated embodiment of the invention, or as a lever of the first class.

I claim:—

1. In combination with the frame and an axle of a vehicle, a shock-absorber having two relatively-rotatable members connected, respectively, with said frame and axle, and movement-resisting mechanism between said members comprising a lever fulcrumed at one end on one of said members, adjustable means between the other end of the lever and said member for adjusting yielding movement of the lever, and means connected with the other of said members, and engaging the lever between its ends, for moving the lever.

2. In combination with the frame and an axle of a vehicle, a shock-absorber having two relatively-rotatable members connected with said frame and axle, respectively, and movement-resisting mechanism between said members comprising a lever fulcrumed on one member, a spring interposed between said member and the lever, and means connected with the other member for moving the lever against the resistance of the spring.

3. In combination with the frame and an axle of a vehicle, a shock-absorber having two relatively-rotatable members, and movement-resisting mechanism between said members comprising a lever fulcrumed on one member, a spring interposed between said member and the lever, means for adjusting the force of the spring, and means connected with the other member for moving the lever against the resistance of the spring.

4. In combination with the frame and an axle of a vehicle, a shock-absorber having two relatively-rotatable members, and movement-resisting mechanism between said members comprising two levers fulcrumed on one member, resilient means coöperating with the levers to control the movement thereof, and a cam connected with the other member and located between the levers in position to engage both levers between their fulcrums and their points of engagement with the resilient means.

5. In combination with the frame and an axle of a vehicle, a shock-absorber having two relatively-rotatable members of which one constitutes a casing having an inwardly-extending lug, a cam located within the casing and connected with the other relatively-rotatable member, a cam-lever fulcrumed upon said lug and engaging the cam, and a spring coöperating with the cam-lever and located within the casing.

JAMES H. SAGER.

Witnesses:
FARNUM F. DORSEY,
D. GURNEE.